United States Patent [19]

Knipp et al.

[11] Patent Number: 5,397,225
[45] Date of Patent: Mar. 14, 1995

[54] MOLD FOR THE PRODUCTION OF LATEX FOAM ARTICLES

[75] Inventors: Herbert Knipp; Friedrich G. Schmidt, both of Haltern; Karl Tessmann, Marl, all of Germany

[73] Assignee: Huels Aktiengesellschaft, Marl, Germany

[21] Appl. No.: 28,268

[22] Filed: Mar. 9, 1993

[30] Foreign Application Priority Data

Mar. 12, 1992 [DE] Germany ............... 42 07 898.9

[51] Int. Cl.⁶ .................. B29C 33/38; B29C 33/56; B29C 71/04
[52] U.S. Cl. .................. 425/4 R; 249/115; 249/134; 264/22; 264/41; 264/130; 264/338; 425/174.4; 425/436 R; 425/817 R
[58] Field of Search .......... 264/22, 25, 26, 27, 264/DIG. 9, DIG. 10, DIG. 15, 331.12, 41, 51, 130, 337, 338; 249/121, 134; 425/174.8 R, 17.41, 174.4, 4 R, 436 R, 436 RM, 817 R; 249/115, 117

[56] References Cited

U.S. PATENT DOCUMENTS

| | | | |
|---|---|---|---|
| 3,383,435 | 5/1968 | Cizck | 525/132 |
| 3,663,661 | 5/1972 | Katchmann | 525/133 |
| 3,737,266 | 6/1973 | Yamamoto | 249/134 |
| 3,803,274 | 4/1974 | Nakashima et al. | 425/174 |
| 4,499,036 | 2/1985 | Hawkes, Jr. | 264/46.9 |
| 4,513,120 | 4/1985 | Bennett, Jr. et al. | 523/316 |
| 4,538,787 | 9/1985 | Fox et al. | 249/115 |
| 4,614,633 | 9/1986 | Steinbach et al. | 264/338 |
| 4,681,901 | 7/1987 | Gavin et al. | 264/25 |
| 4,746,482 | 5/1988 | Ribbing et al. | 264/102 |
| 4,994,217 | 2/1991 | Banevicius et al. | 264/45.9 |
| 5,028,366 | 7/1991 | Harakal et al. | 264/338 |
| 5,071,331 | 12/1991 | Falco | 249/121 |
| 5,128,073 | 7/1992 | Allen et al. | 264/53 |
| 5,166,249 | 11/1992 | Hocks et al. | 524/423 |
| 5,260,110 | 11/1993 | Nichols | 428/2 |
| 5,302,326 | 4/1994 | Minegishi et al. | 264/338 |
| 5,332,621 | 7/1994 | Schmidt et al. | 264/45.1 |

FOREIGN PATENT DOCUMENTS

| | | |
|---|---|---|
| 0377115 | 7/1990 | European Pat. Off. |
| 2266587 | 10/1975 | France . |
| 1779748 | 9/1971 | Germany . |
| 3138401 | 4/1983 | Germany . |
| 3900809 | 7/1990 | Germany . |

OTHER PUBLICATIONS

Database WPI, AN-86-147701, JP-A-61 083 009, Apr. 26, 1986.
Database WPI, AN-92-061530, JP-A-007 150, Apr. 24, 1990.
Patent Abstracts of Japan, vol. 8, No. 32 (M-275), Feb. 10, 1984, JP-A-58 188 541, Nov. 4, 1983.

*Primary Examiner*—Jay H. Woo
*Assistant Examiner*—Duane S. Smith
*Attorney, Agent, or Firm*—Oblon, Spivak, McClelland, Maier & Neustadt

[57] ABSTRACT

Latex foam molded articles are prepared using a plastic mold heated by means of microwave energy. The molded article can be readily released from the mold. The mold has good dimensional accuracy and a long serviceable lifetime. The walls of the mold are composed of a molding composition which has the following constituents:
 a) 20 to 100 parts by weight of polyphenylene ether,
 b) 0 to 30 parts by weight of styrene polymers,
 c) 0 to 30 parts by weight of impact-modifying additives,
 d) 0 to 40 parts by weight of reinforcing agents and/or fillers and
 e) 0 to 15 parts by weight of additives.

The mold surface is passivated. Compared with conventional processes for the production of latex foam molded articles, the cycle time and the energy consumption are considerably reduced when this mold is used.

18 Claims, No Drawings

MOLD FOR THE PRODUCTION OF LATEX FOAM ARTICLES

BACKGROUND OF THE INVENTION

1. Field of the Invention

The invention relates to a plastic mold which is suitable for the production of latex foam moldings (molded articles) by means of microwave energy. Economic and production engineering advantages are achieved by the use of the mold according to the invention.

2. Discussion of the Background

The production of latex foam molded articles, such as for example, mattresses and cushions, is currently still carried out exclusively in metal molds, which are heated directly by heating fluid or steam. The use of microwave energy demands the use of nonmetallic molds. The production of latex foam moldings by means of microwave energy is described in DE-OS 39 00 809. The proposed mold materials are materials having a thermal conductivity of less than 1 W/m×K, such as for example, polysulphone, polycarbonate, polytetrafluoroethylene, polyethylene and polypropylene.

As experiments have shown, the plastics mentioned in DE-OS 39 00 809 are, however, not suitable for the production of large molds, such as for example, for mattresses. At practicable wall thicknesses, polyethylene, polypropylene and polytetrafluoroethylene have too low a rigidity and thus mold stability, which leads to the molded articles having inadequate dimensional accuracy.

Under continual exposure to alternating temperatures when filling the hot mold with cold latex foam, and under the influence of moisture, alkali, residual monomers, vulcanizing agents and their decomposition products and the mechanical stress on the mold, for example when releasing the articles from the mold, polycarbonate and polysulphone show stress cracks after a short time.

R. Ostwald and A. F. Bogenschuetz, Kunststoffe (1988), 78 (6), pages 499 to 504, describe the use of films which can be composed of polyphenylene ether, as a polymer anticorrosion coating for high-frequency components.

Foamed foodstuff packaging materials, composed of molding compositions based on polyphenylene ether, for use in microwave ovens are described in EP-A-0 325 779 and EP-A-0 377 115.

SUMMARY OF THE INVENTION

One object of the present invention is to develop a mold which can be readily filled and from which the molded article can be readily released. The mold should also have, in addition to good dimensional accuracy, a long serviceable lifetime.

This and other objects which will become apparent in the course of the following specification have been achieved by the present mold in which the mold walls are made of a polyphenylene ether molding composition and the mold surface is passivated.

DETAILED DESCRIPTION OF THE PREFERRED EMBODIMENTS

In the present invention, a mold is produced in which the mold walls are prepared from a molding composition based on polyphenylene ether (PPE) polymer material. The mold inserts or displacement elements frequently required for specific applications can be produced from the same material. Because of the lower mechanical stress on the displacement elements, other plastics can also be used, such as for example, polytetrafluoroethylene or polypropylene. The mold inserts/displacement elements can be fixed to the base or the lid, as desired. However, it is economically advantageous to screw them into the baseplate or the lid by means of threaded connections. The mold material according to the invention has the capacity to withstand threading which is adequate for this purpose. In order to prevent air inclusions when filling the mold, vent holes are provided in the lid. The number and distribution of the vent holes is a function of the mold geometry and the direction of flow of the foam and can be easily determined by means of a few preliminary experiments. The diameter of the holes is chosen such that air can escape rapidly, but the foam flowing behind penetrates into the holes to only a small extent such that, on release from the mold, the foam remains adhering to the molding in the form of small nipples and consequently frees the openings again. The required diameter can be determined by a person skilled in the art from a few experiments.

The polymer molding materials used according to the invention have the following composition:
- 20 to 100 parts by weight of polyphenylene ether (A),
- 0 to 80 parts by weight of polystyrene (B),
- 0 to 30 parts by weight of impact-modifying additives (C),
- 0 to 40 parts by weight of reinforcing agents and/or fillers (D) and
- 0 to 15 parts by weight of additives (E).

In order to preclude the risk of warping during vulcanization, it is preferable that the heat distortion resistance, according to ISO 75, method B, of the molding composition be at least 110° C., preferably at least 120° C. and particularly preferably at least 125° C.

The polyphenylene ether (PPE) has monomer units of the formula

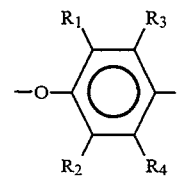

in which $R_1$ and $R_2$ are independently a $C_{1-6}$ n-alkyl group, or $R_1$ is hydrogen and $R_2$ is a $C_{1-6}$ tertiary alkyl group; and $R_3$ and $R_4$, independently of one another, are a methyl group or hydrogen. In a preferred embodiment, $R_1=R_2=CH_3$ and $R_3=R_4=H$.

These polyphenylene ethers can be prepared from the corresponding phenols or 4-halophenols by any process known in the art. Usually, the catalysts used are copper-amine complexes or manganese-containing systems (see DE-OS 32 24 692 and DE-OS 32 24 691 and also U.S. Pat. Nos. 3,306,874; 3,306,875 and 4,028,341).

The viscosity numbers, determined in accordance with DIN 53 728 in trichloromethane at 25° C., are in the range from 35 to 100 ml/g (J value according to DIN 53 728; concentration 5 g/l). Polyphenylene ethers having a viscosity number of 40 to 70 ml/g are preferred.

The polyphenylene ethers, of course, also include modified polyphenylene ethers, for example graft copolymers with vinyl monomers, styrene or other modifying reagents. The polyphenylene ethers are usually used in the form of a powder or granules.

Polystyrene component (B) is either a styrene homopolymer or impact-modified styrene polymer. Suitable monovinyl-aromatic compounds are, in particular, styrene and also the ring-alkylated or side-alkylated styrenes. The alkyl substituents are preferably $C_{1-6}$ alkyl groups. Preferably, however, only styrene is used. The homopolymers are prepared by known processes of bulk, solution or suspension polymerization (see Ullmann's Encyclopaedie der technischen Chemie (Ullmann's Encyclopedia of Industrial Chemistry), volume 19, page 265, Verlag Chemie, Weinheim 1980). The homopolymers generally have average molecular weights (Mv) of about 1000 to 250,000. The processes most often used to prepare impact-modified styrene polymers are bulk or solution polymerization and processes for bulk/suspension polymerization, such as are described, for example, in U.S. Pat. No. 2,694,692 and U.S. Pat. No. 2,862,906. Of course, however, any other known process can also be used.

The rubbers used for this purpose are the natural or synthetic rubbers customary for impact modification of styrene polymers. Suitable rubbers are, for example, natural rubber (NR), polybutadiene, polyisoprene and copolymers, for example random, sequential or block copolymers of butadiene and/or isoprene with styrene and other comonomers which have a glass transition temperature below $-20°$ C. Butadiene polymers which have a 1,4-cis content of between 25 and 99% are particularly suitable. However, acrylate rubbers, ethylene-propylene-diene (EPDM) rubbers, polybutylene rubbers or polyoctenylene rubbers can also be used. The resulting impact-modified styrene polymers have a soft component content of 10 to 60% by weight, preferably of 20 to 45% component by weight. The particle size of the soft component should be in the range from 0.2 to 8$\mu$m.

Suitable impact-modifying additives (C) are, for example, the block copolymers of various structure and mainly composed of vinyl-aromatic and conjugated diene blocks which are described in DE-AS 19 32 234, DE-AS 20 00 118, DE-OS 22 55 930, DE-OS 27 50 515, 24 34 848 and DE-OS 30 38 551, EP-A-0 080 666 and WO-A-83/01 254. However, other impact-modifying additives, such as polyoctenamer, graft or block copolymers of vinyl-aromatic monomers and EP(D)M, acrylate rubbers or mixtures of styrene-butadiene (SBR) rubbers with high and low styrene contents can also be used.

Reinforcing agents and fillers (D) which can be used are, for example, short, long or continuous glass fibers as well as organic or inorganic fillers, such as, for example, talc or glass beads.

The composition according to the invention can contain additives (E), such as, for example, pigments, organic colorants, oligomers, antistatic agents, stabilizers and processing auxiliaries. Suitable stabilizers comprise organic phosphites, such as, for example, didecyl phenyl phosphite and trilauryl phosphite, sterically hindered phenols, tetramethylpiperidine derivatives, benzophenone derivatives and triazole derivatives as well as stabilizers based on hindered amines, the so-called HALS compounds. Suitable processing auxiliaries are, for example, polyethylene or waxes, such as, for example, oxidized hydrocarbons and also their ester or amide derivatives or their alkali metal and alkaline earth metal salts. The type and amount of the additives must be so chosen so that no substantial coupling of the mold material occurs in the microwave field.

The individual components are mixed in the melt in a known manner, either in batch operation or continuously. The conventional equipment for the treatment of highly viscous melts is suitable for melting and mixing. Twin-screw kneaders and co-kneaders are particularly suitable.

The molding compositions according to the invention are preferably prepared by melting and mixing the polyphenylene ether, where appropriate together with an impact component and/or a styrene polymer and components (D) to (E). Components (B) to (E) can also be incorporated in the melt of (A). For example, a co-rotating twin-screw kneader operating continuously can be used. The melt temperature is between 250° and 350° C., preferably between 270° and 320° C. Simultaneous degassing of the melt is expedient.

The mold material according to the invention has a very high adhesion to SBR and SBR/natural(NR) rubbers. Experimentation with molds made from polyphenylene ether molding compositions inevitably shows that molds of this type cannot be used successfully because adhesion of the mold to latex foams produced from styrene/butadiene copolymers is too great. In such a case, release from the mold is not possible; instead, a firm bond is formed. Passivation, at least of the inner mold surface, is therefore required. Adhesion can be suppressed or reduced to such an extent that problem-free release of the articles from the mold is possible when using conventional water-soluble release agents (for example, a 5 wt. % strength aqueous POLYWAX 6000 solution), by the following measures: (a) storing the mold in hot air and/or light for several hours, (b) washing the mold surfaces with alkaline soaps (for example potassium oleate) or (c) brief coating of the mold material with a SBR/NR latex film.

Passivation by heating or exposure to light is not particularly limited with regard to temperature and exposure time. Generally, however, passivation is achieved by heating the mold at a temperature from about 50° C. but below the decomposition temperature of the molding material. Preferred temperatures are about 50°–200° C., more preferably 70°–150° C. Passivation by heating may be conducted at a single temperature or using a continuous or stepwise gradient of decreasing temperatures. Heating or exposure to light is conducted for a period of time sufficient to effect passivation, generally about 0.5–10 hours, more preferably about 1–5 hours.

The mold surface may also be passivated by washing the mold surfaces with an alkaline soap. Suitable alkaline soaps are alkali and alkaline earth metal salts of fatty acids, preferably saturated or unsaturated fatty acids containing 10–30 carbon atoms. Ammonium ($NH_4^+$) salts and alkyl, aralkyl or aryl quaternary ammonium ($NR_4^+$) salts, preferably quaternary ammonium salts in which R is an alkyl group having 1–6 carbon atoms, may also be used. The concentration of the soap solution is not critical and may be any concentration sufficient to effect passivation. The mold is then air dried or dried with warm air.

The mold may also be passivated by coating the mold with a latex rubber film followed by removal of the film from the mold. A rubber latex which does not contain a vulcanizing agent is applied to the mold and dried to form a thin film. Removal of the thin film results in passivation of the mold surface. Preferred latexes are prepared from SBR, NR and mixtures thereof.

The mold of the present invention can be used with conventional water-soluble adherents or mold release agents. The mold release agent may be applied to the mold surfaces by spraying a solution, dispersion or emulsion of the release agent onto the mold surfaces. The mold release agent may also be incorporated into the latex. Any conventional mold release agent may be used which does not adversely affect the physical properties or appearance of the latex or final molded article. Suitable mold release agents include silicon and wax release agents such as those described in Kirk-Othmer, Encyclopedia of Chemical Technology, 1978, Vol. 1, pages 5-7, John Wiley & Sons, New York, N.Y.

Because of their considerably longer serviceable life, the molds produced in accordance with this invention are more economical. They make it possible to produce large latex foam moldings with the requisite dimensional accuracy. In a continuous production process, the cycle times are reduced as a result of the rapid filling and release from the mold. The use of displacement elements with a screw thread makes possible rapid adaptation to application requirements and re-use thereof in new or other molds.

The production and composition of latexes which are suitable for this invention are indicated, for example, in DE-OS 37 04 118 and DE-OS 34 47 585.

When producing latex foam by the mechanically blown foam method, vulcanizing agents and, where appropriate, processing auxiliaries are added to the latex and the latter are brought to the desired density by blowing in air. After the corresponding degree of foaming has been reached, a conventional gelling agent is mixed in and the foam is filled into the mold.

The mold can have a temperature of 50° to 100° C. at the time when it is filled with the latex foam. In contrast to a conventional process, the mold does not have to be cooled to a temperature below 35° C. In addition, it is not necessary to prepare the foamed latex in accordance with a special formulation. Because of the low thermal conductivity of the nonmetallic material, the latex foam is not undesirably impaired during gelling, even at those points which are in contact with the walls of the mold. The heat which the mold has taken up during the preceding vulcanization processes is retained virtually completely in the mold.

For gelling and vulcanization, the latex foam present in the mold is heated to a temperature of up to 100° C. within a few minutes by means of microwave irradiation. The microwaves have a frequency of 1 to 100 GHz, preferably 2 to 25 GHz. The dimensions of the microwave field can be adjusted to the dimensions of the mold in a known manner.

The layer thickness of the latex foam introduced into the mold can be varied within wide limits to up to several decimeters. Even in a very thick layer, the foam gels and vulcanizes very uniformly.

The dwell time of the latex foam in the microwave field is dependent on the power density of the field, the heat requirement of the latex foam which is needed in order to reach the desired temperature, and the time which the foam needs for vulcanization. The optimum dwell time and the field power density to be set can be readily determined in a preliminary experiment.

For a foam density of 0.1 g/cm$^3$, a dwell time of 5 minutes is achievable for a foam thickness of 3 cm and of 8 minutes for a foam thickness of 15 cm, provided the transmitter power used is unchanged.

Compared with known processes the cycle time and the energy consumption are considerably reduced.

Other features of the invention will become apparent in the course of the following descriptions of exemplary embodiments which are given for illustration of the invention and are not intended to be limiting thereof.

EXAMPLES

The following molding compositions based on polyphenylene ether were used in the examples: VESTORAN ® 1300, VESTORAN ® 1300 GF and VESTORAN ® 1900 grades from Hüls AG, D-4370 Marl.

The process used in the examples for the production of latex foam by means of microwave heating is described in DE-OS 39 00 809.

The test latexes used were the styrene-butadiene copolymers BUNATEX ® SL 2800 and BUNATEX ® SL 3510 (both from Hüls AG, Marl) and blends containing natural-rubber latex. The BUNATEX ® grades had a pH of 10.5 and a residual monomer content of 700 ppm. The styrene content in the polymer was about 28% in the case of BUNATEX ® SL 2800 and about 35% in the case of BUNATEX ® SL 3510. The latexes contained the customary gelling agents, vulcanizing agents and processing auxiliaries.

The displacement elements were made of polypropylene in all examples. The diameter of the vent holes was 2.5 mm. At the time of filling, the mold temperature was 80° to 95° C. and the latex foam temperature was 15° to 20° C.

Table 1 shows the heating and thus the absorption characteristics of diverse plastics upon microwave irradiation. The treatment was carried out in a microwave cavity at a power density of 20 kW/m$^3$. The weight of the test pieces was 25 g.

TABLE 1

| Product | Dwell time (min) | Temperature (°C.) |
|---|---|---|
| Polyethylene (Hülls AG) | 10 | 36 |
| Polypropylene (Hülls AG) | 10 | 37 |
| Polysulphone, white (Röhm GmbH) | 10 | 49 |
| Polysulphone, black (Röhm GmbH) | 10 | 54 |
| Polycarbonate (Röhm GmbH) | 10 | 57 |
| Polyphenylene oxide (VESTOPAN ® 1300) | 10 | 38 |
| Polyphenylene oxide (VESTORAN ® 1900) | 10 | 36 |
| Polyester (VESTOPAL ® 152) | 4 | softening |
| Polyoxymethylene (HOSTAFORM ® 2321) | 4 | softening |
| Polyvinylidene fluoride | 3.5 | softening |
| Polyvinylidene fluoride (DYFLORR ® 2000 ME) | 1.5 | softening |
| Polyamide 6/3/T (TROGAMID ® T 5000) | 4.5 | softening |
| Polyamide 6.12 (VESTAMID ® D 18) | 3.5 | softening |
| Polyamide 12 (VESTAMID ® L 1640) | 2.5 | softening |
| Polybutylene terephthalate ESTODUR ® B 1000) | 6 | softening |

The passivation of the materials according to the invention was achieved by the measures shown in Table 2.

TABLE 2

| Material | Passivation measure |
|---|---|
| VESTORAN ® (1300, 1300-GF 30, 1900) | I: 2 h/130° C. + 1 h/70° C. |
| VESTORAN ® (1300, 1300-GF 30, 1900) | II: 17.5% strength potassium oleate, drying for 1 h/70° C. |
| VESTORAN ® (1300, 1300-GF 30, 1900) | III: SBR/NIR blend 1:1 without vulcanizing agent, drying for 1 h/70° C.; |

TABLE 2-continued

| Material | Passivation measure |
|---|---|
| | subsequent mechanical removal by stripping off the film |

TABLE 3

| Example | Material | Dimensional accuracy (%) | Mold release time (sec.) | Susceptibility to cracking (cycles) |
|---|---|---|---|---|
| 1 | Polyethylene | inadequate | <90 | —[b] |
| 2 | Polypropylene | inadequate | <90 | —[b] |
| 3 | Polytetrafluoroethylene | inadequate | <90 | —[b] |
| 4 | Polysulphone | good (<3) | <90 | 15 |
| 5 | Polycarbonate | good (<3) | <90 | 10 |
| 6 | VESTORAN ® (1300, 1900), untreated | good (<3) | mold release impossible because adhesion too great | —[b] |
| 7 | VESTORAN ® 1300[a] | good (<3) | <90 | >100 |
| 8 | VESTORAN ® 1300-GF 30[a] | good (<3) | <90 | >100 |
| 9 | VESTORAN ® 1900[a] | good (<3) | <90 | >100 |

[a] passivated in accordance with I (see Table 2)
[b] not determined

Materials which already showed softening on microwave irradiation (Table 1) were not further tested.

The dimensional accuracy was assessed as the effect of the mold material rigidity and temperature resistance on the difference in thickness between the edge zone and the center of the mattress; it should be no greater than 3%. The time required for defect-free release of the mattress from the mold was regarded as a measure of the adhesion and should be less than 90 seconds. The susceptibility of the mold material to cracking was assessed on the basis of the number of production cycles before the appearance of the first cracks clearly discernible with the naked eye.

As Table 3 shows, rapid mold release is achieved with each of the three VESTORAN ® grades. After 100 cycles (end of the test) no cracks whatsoever were discernible. Corresponding results were obtained after passivation measures II and III.

In the case of the other materials tested, either the dimensional accuracy was inadequate or the susceptibility to cracking was far too high. A firm bond was formed in the case of non-passivated VESTORAN ®.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A mold for the production of vulcanized latex foam moldings by means of microwave heating, said mold having walls with an inside surface, said walls made of a molding composition comprising:
   a) 20 to 100 parts by weight of polyphenylene ether, having monomer units of the formula

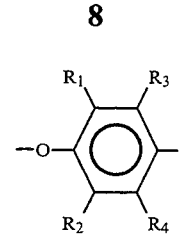

wherein $R_1$ and $R_2$ are independently selected from the group consisting of $C_{1-6}$ n-alkyl groups, and the group where $R_1$ is hydrogen and $R_2$ is a $C_{1-6}$ tertiary alkyl group; and $R_3$ and $R_4$, independently, are a methyl group or hydrogen,
   b) 0–80 parts by weight of styrene polymers,
   c) 0–30 parts by weight of impact-modifying compounds,
   d) 0–40 parts by weight of reinforcing agents, fillers or mixtures thereof, and
   e) 0–15 parts by weight of additives,
wherein said inside surface of the mold walls is passivated, reducing adhesion between said passivated mold wall surface and the vulcanized latex foam molding, providing problem-free release of the molding from the mold.

2. The mold of claim 1, wherein said molding composition has a heat distortion resistance of at least 110° C.

3. The mold of claim 1, wherein said molding composition has a heat distortion resistance of at least 120° C.

4. The mold of claim 1, wherein said molding composition has a heat distortion resistance of at least 125° C.

5. The mold of claim 1, wherein $R_1=R_2=CH_3$, and $R_3=R_4=$ hydrogen.

6. The mold of claim 1, said molding having a lid contacting said walls and vent holes in said lid.

7. The mold of claim 6, wherein said lid is made of said molding composition.

8. The mold of claim 1, wherein said molding composition comprises said styrene polymers.

9. The mold of claim 8, wherein said styrene polymer is a polystyrene.

10. The mold of claim 8, wherein said styrene polymer is a rubber impact-modified styrene polymer.

11. The mold of claim 1, wherein said molding composition comprises said impact-modifying compounds.

12. The mold of claim 11, wherein said impact-modifying compound is polyoctenylene.

13. The mold of claim 1, wherein said molding composition comprises said reinforcing agents, fillers or mixtures thereof.

14. The mold of claim 1, comprising said additives selected from the group consisting of colorants, antistatic agents, stabilizers, processing auxiliaries and mixtures thereof.

15. The mold of claim 1, said mold further comprising a mold base made of said molding composition contacting said mold walls.

16. The mold of claim 15, said mold comprising displacement elements made of said molding composition attached to said base.

17. The mold of claim 15, further comprising displacement elements of a nonpolyphenylene ether polymer attached to said base.

18. The mold of claim 1, wherein said inside surface of the mold walls is passivated by heating said mold walls, irradiating said mold walls with light, washing said mold walls with an alkaline soap or coating said mold walls with a latex film and subsequently removing the latex film.

* * * * *